United States Patent [19]
Terashima et al.

[11] Patent Number: 4,750,003
[45] Date of Patent: Jun. 7, 1988

[54] MAGNETIC DISPLAY UNIT

[75] Inventors: Akira Terashima; Masahiko Ikeda; Jun Takano; Noriyuki Nishiyama; Tatsuya Igawa; Kazuo Anzai, all of Kanagawa, Japan

[73] Assignee: Pilot Man-Nen-Hitsu Kabushiki Kaisha, Tokyo, Japan

[21] Appl. No.: 91,144

[22] Filed: Aug. 31, 1987

[30] Foreign Application Priority Data

| | | | |
|---|---|---|---|
| Aug. 29, 1986 | [JP] | Japan | 61-203441 |
| Oct. 27, 1986 | [JP] | Japan | 61-255398 |
| Nov. 26, 1986 | [JP] | Japan | 61-181759[U] |
| Dec. 26, 1986 | [JP] | Japan | 61-204172[U] |
| Apr. 14, 1987 | [JP] | Japan | 62-91772 |
| Apr. 17, 1987 | [JP] | Japan | 62-94631 |
| Apr. 28, 1987 | [JP] | Japan | 62-105916 |
| May 12, 1987 | [JP] | Japan | 62-70747[U] |

[51] Int. Cl.⁴ .............................................. G01D 15/10
[52] U.S. Cl. ................................... 346/74.2; 346/74.5
[58] Field of Search .................... 346/153.1, 154, 74.5, 346/74.7, 74.2; 400/119; 101/DIG. 5; 358/301; 360/1, 15, 16, 62, 110

[56] References Cited

U.S. PATENT DOCUMENTS 3,947,879 3/1976 Stauffer .............................. 346/74.7
4,414,554 11/1983 Springer ............................ 346/74.5

*Primary Examiner*—Arthur G. Evans
*Attorney, Agent, or Firm*—Sughrue, Mion, Zinn, Macpeak, and Seas

[57] ABSTRACT

A magnetic display unit in which a magnetic panel encloses a colored liquid in which magnetic particles are dispersed. A recording head moves over the panel and has a plurality of electromagnets arranged with at least three electromagnets on each of parallel lines inclined to the direction of movement of the recording heads with all the electromagnets being arranged on equal pitch perpendicular to this movement direction. The electromagnets are selectively actuated as the recording head moves to write a dot pattern.

22 Claims, 19 Drawing Sheets

MAGNETIC DISPLAY UNIT

BACKGROUND OF THE INVENTION

1. Field of the Invention

This invention relates to a display unit in which a recording head is moved over a magnetic panel to apply its magnetic field to the panel so that dots are combined to display data on the magnetic panel.

2. Background of the Invention

An X-Y plotter is known in the art which includes a magnetic panel made up of two transparent substrates filled with a colored dispersion liquid in which magnetic particles are dispersed. A magnetic pen made up of an electromagnet is moved over the magnetic panel in a selected pattern (see U.S. Pat. No. 4,646,107).

When, in the X-Y plotter, current is applied to the electromagnet while the position of the magnetic pen is positioned at a selected location, then the magnetic particles to which the magnetic field is applied are collected at that location. As a result, characters or the like are displayed by the difference between the color of the magnetic particles and that of the dispersion liquid.

However, the X-Y plotter suffers from a difficulty that, since the magnetic pen is moved to display segmented characters or the like on the magnetic panel, the speed of writing data to be displayed is low.

SUMMARY OF THE INVENTION

In view of the foregoing, an object of this invention is to provide a display unit which can display at high speed predetermined characters, figures, etc. on a magnetic panel and is superior in printing quality to a conventional display unit.

Another object of the invention is to provide a display unit in which a general purpose control function is employed to provide a flexible system arrangement.

Other objects of the invention will become apparent from the following description.

The invention can be summarized as follows. In a dot matrix type magnetic display unit, while a recording head with a plurality of electromagnets is moved in a predetermined direction over a magnetic panel filled with a colored dispersion liquid in which magnetic particles are dispersed, the electromagnets are selectively energized to display data with dots combined. According to the invention, the electromagnets are so arranged that at least three electromagnets are positioned respectively on a plurality of lines inclined with respect to the direction of movement of the recording head and that the electromagnets are positioned respectively on a plurality of lines which are extended in parallel with the direction of movement of the recording head and arranged at equal intervals.

In this display unit, while a recording head with a plurality of electromagnets is moved over a magnetic panel in a predetermined direction, the electromagnet are selectively activated to display data with dots combined. The present inventors have found that such a display unit operates at higher display speed than a conventional display unit using only one electromagnet for writing data. However, it is necessary for the electromagnets to have a high magnetomotive force in order to display data on the magnetic panel at high speed with high printing quality. Since the magnetomotive force depends on the number of turns of the coil of each electromagnet, the resultant electromagnet is larger in size than its printing end portion or tip. Furthermore, as a result of research, the present inventors have found that when these electromagnets are arranged in such a manner that at least three electromagnets are positioned respectively on a plurality of lines inclined with respect to the direction of movement of the recording head and the electromagnets are positioned respectively on a plurality of lines which are extended in parallel with the direction of movement of the recording head and arranged at equal intervals, data of high printing quality can be displayed on the magnetic panel even at high speed and can be read with ease.

In the case where only two magnets are positioned on each of the plurality of thus inclined lines, the dot recording density is decreased with increasing ratio of the size of the electromagnet to the size of the electromagnet print end portion. This trend begins to occur when $D=2d$, where D is the diameter of the electromagnet, and d is the diameter of the electromagnet printing tip. In the case where, on the other hand, at least three electromagnets are arranged on each of the inclined lines, a display can be obtained on the magnetic panel which is high in density and excellent in printing quality and which can be read with ease. This will be described in more detail.

FIG. 1 shows a recording head as a comparison example. More specifically, part (a) of FIG. 1 shows the recording head in which six electromagnets corresponding to printing dots are arranged in two vertical lines in such a manner that the odd-numbered ones are on one line and the even-numbered one are on the other line. That is, they are staggered in two vertical lines. The resulting printing resolution in the vertical direction is show in part (b) of FIG. 1. In this arrangement, $D=3d$ where D is the diameter of the electromagnets, and d is the diameter of the electromagnet's printing end portions. In this case, the distances between the printing tip cannot be decreased. Therefore the dot density is low as is apparent from the part (b) of FIG. 1 with the result that the printing quality cannot be improved. This is due to the fact that, because of the structure of the electromagnets, adjacent electromagnets are in close contact with each other, and therefore it is impossible to arrange the electromagnet printing end portions so as to display dots with high density.

This difficulty can be eliminated by the arrangement of the electromagnets as shown, for instance, in FIG. 2. That is, electromagnets 65 have a structure such that in which $D=3d$, where D is the diameter of each electromagnet and d is the diameter of its printing tip 66. The electromagnets 65 are arranged in such a manner that three electromagnets 65 are positioned on each of two lines inclined with respect to the direction of movement of a magnetic head 31 (as indicated by the arrow). All the six electromagnets 65 are positioned respectively on six lines which are extended n parallel with the direction of the movement of the recording head and are arranged at equal intervals. With this arrangement, the distances between the dots can be decreased, i.e., the dot density can be increased, as shown in the part (b) of FIG. 2.

In the display unit of the invention, the relation $P \leqq d$ is established in which P is the line pitch of the plurality of lines which are extended in parallel with the direction of movement of the recording head and are arranged at equal intervals, so that the dots are displayed side by side. That is, the printing quality is improved.

It is preferable that the electromagnets are so designed that a core with a tapered tip is inserted into a bobbin on which a coil is wound. The coil forms magnetic leakage flux in such a manner that the tapered tip is inserted in a hole formed in a magnetic thin plate disposed on one end of the bobbin. An annular gap is formed between the tapered tip and the cylindrical wall or the hole in the thin plate.

If, in this case, the cylindrical wall of the hole is modified into an inwardly tapered cylindrical wall with $\theta' \geqq \theta$ (where $\theta'$ is the taper angle of the cylindrical wall and $\theta$ is the taper angle of the tapered tip of the core, then the resultant magnetic flux is more acceptable.

The recording head in the display unit of the invention may be either a serial type recording head or a line type recording head.

In the case where a serial type recording head is employed, a motor moves the recording head in the aforementioned direction of movement and another motor moves the erasing head in an auxiliary scanning direction perpendicular to the movement direction. Then, in this case, it is unnecessary to provide an erasing head moving device for moving the erasing head because the recording head and the erasing head are moved together in association.

If, in the case where a line type recording head is employed, the erasing head is moved in association with the recording head similarly as in the above-described case, then the provision of the erasing head moving device is also unnecessary.

Thus, according to the invention the display unit can display predetermined characters, figures, etc. on the magnetic panel at high speed with high printing quality when compared with the conventional display unit. In the display unit, a general purpose control means is employed so that data for controlling the drive of the moving means and the energization of the electromagnets can be obtained from an external device such as a personal computer or an image scanner. Thus, the display unit provided according to the invention is flexible in system arrangement.

Furthermore in the display unit of the invention, a reading head for reading data displayed on the magnetic panel is disposed beside the recording head in such a manner that it driven in the direction of movement of the recording head. Therefore, scanning the magnetic panel with the reading head can copy the data on the magnetic panel.

It is preferable to provide a transparent nonpolar polymer sheet or layer on the transparent top substrate of the magnetic panel. With the display unit thus designed, data hand-written with an ordinary white board marker can be added to data on the magnetic panel.

BRIEF DESCRIPTION OF THE DRAWINGS

FIG. 18 is an explanatory diagram show in a recording head, FIG. 19 is a section a view showing the electromagnet pushing mechanism, and FIG. 20 is an enlarged section a view showing essential components of the mechanism in detail.

FIG. 21 is a front view of the mechanism, FIG. 22 is a rear view of the mechanism, FIG. 23 is an enlarged sectional view taken along line XXIII—XXIII in FIG. 22, FIG. 24 is also an enlarged sectional view taken along line XXIV—XXIV in FIG. 22, FIG. 25 is an enlarged sectional view of the part A in FIG. 23, and FIG. 26 is an explanatory diagram showing the positional relationships between the recording head, the erasing head, and pushing rollers.

DETAILED DESCRIPTION OF THE PREFERRED EMBODIMENTS

Figure 1A:
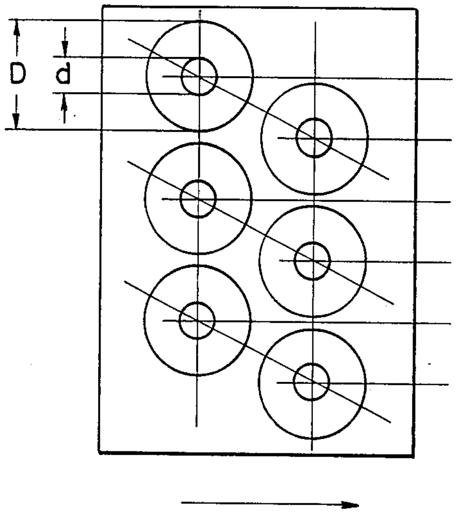
FIG. 1 is an explanatory diagram showing as a comparison example an example of the arrangement of the electromagnets in a recording head and an example of its print.
Figure 1B:
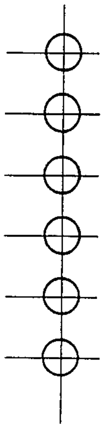
Figure 2A:
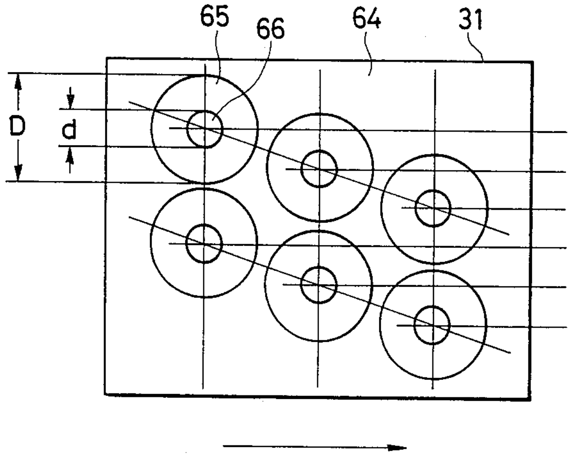
FIG. 2 is an explanatory diagram showing one example of the arrangement of electromagnets in a recording head employed in a display unit according to the invention, and an example of its print.
Figure 2B:
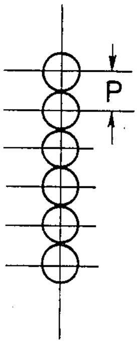
Figure 3:
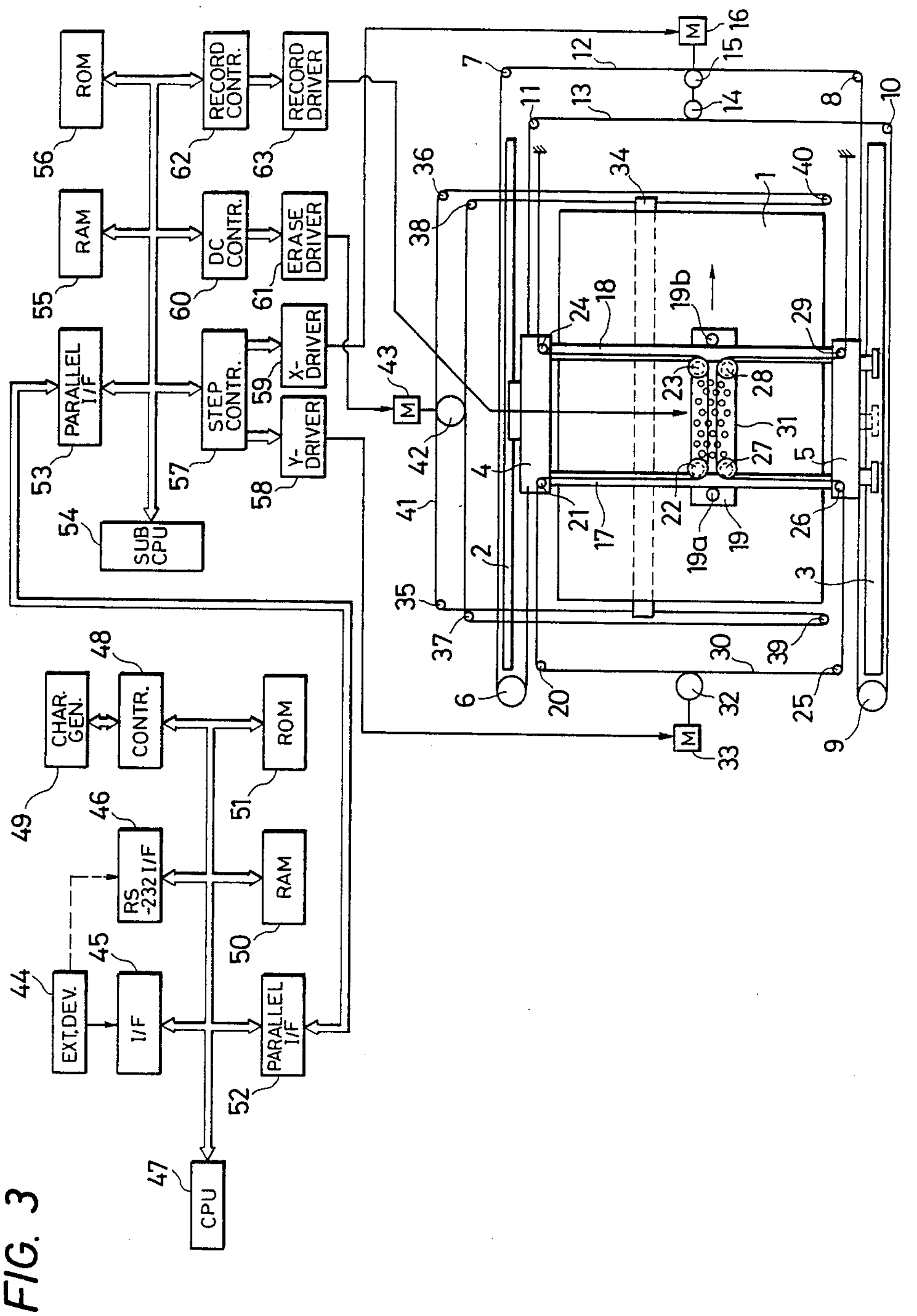
FIG. 3 is an explanatory diagram, partly as a block diagram showing one example of the display unit according to the invention.
Figure 4:
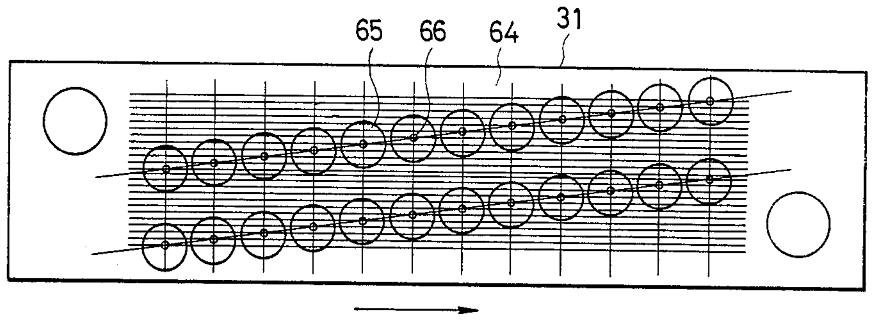
FIGS. 4 through 9, 11 and 12 are explanatory diagrams showing a variety of examples of the arrangement of the electromagnets in the recording head.

In FIG. 3, a magnetic panel 1 is made up of two transparent substrates. The magnetic panel 1 is enclosed with a dispersion liquid (usually white) in which magnetic particles (usually black) are dispersed. Slide blocks 4 and 5 are mounted on X-direction rails 2 and 3, respectively, which are provided on both sides of the magnetic panel 1. The slide blocks 4 and 5 are provided with guide rollers 6, 7, 8, 9 10 and 11. As shown in FIG. 3, X-direction wires 12 and 13 are laid over these guide rollers 6 through 11, and their ends are fastened to the slide blocks 4 and 5. Also shown are an X-direction drive pulley 14, 15 and an X-direction drive motor 16.

A carriage 19 is mounted on Y-direction rails 17 and 18, which are connected between the slide blocks 4 and 5. The carriage 19 is provided with guide rollers 20 through 29, over which a Y-direction wire 30 is laid as shown in FIG. 3. The two ends of the Y-direction wire 30 are fastened to stationary surfaces. The guide rollers 21 and 24 are rotatably held to the slide block 4, the guide rollers 26 and 29 to the slide block 5, and the guide rollers 22, 23, 27 and 29 to the carriage 19.

One of recording heads 31 shown in FIGS. 2, and 4 through 12 is fixedly attached to the carriage 19.

In the recording heads 31 shown in FIGS. 4, 6, 8 and 10, electromagnets 65 are arranged in such a manner that they are positioned at the intersections of horizontal lines inclined with respect to the direction of movement of the recording head and vertical lines perpendicular to the direction of movement of the head. They also lie on horizontal lines which are arranged at equal intervals in parallel with the direction of movement of the head. In the recording heads of FIGS. 4 and 6, D=7d, where D is the diameter of the electromagnets 6 and d is the diameter of the electromagnet's printing end 66. In the recording head of FIG. 8, D=5d. In the recording head of FIG. 10, D=2.5d.

Figure 5:
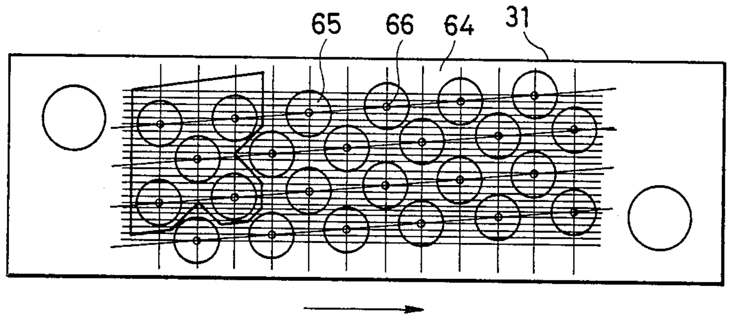
Figure 6:
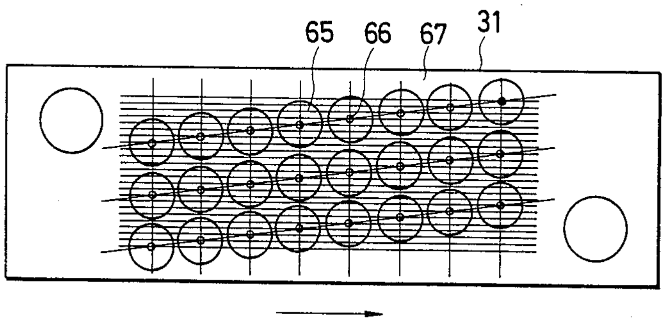
Figure 7:
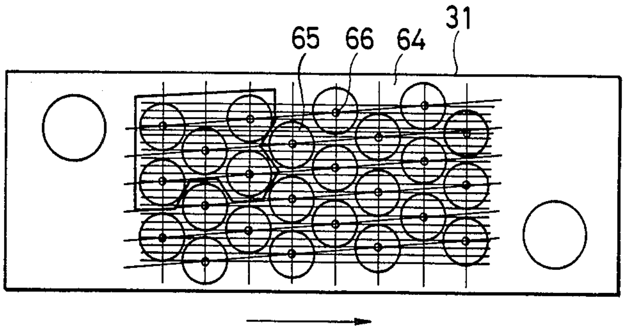
Figure 8:
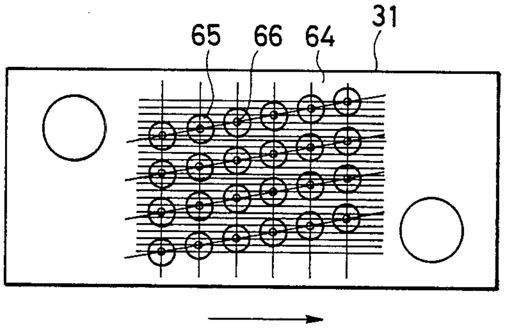
Figure 9:
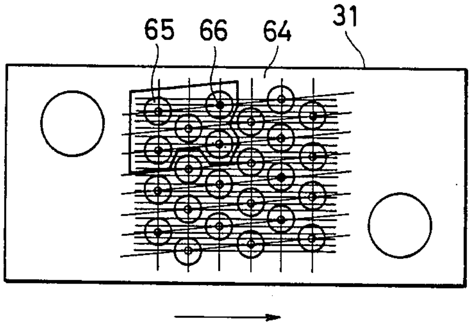
Figure 10A:
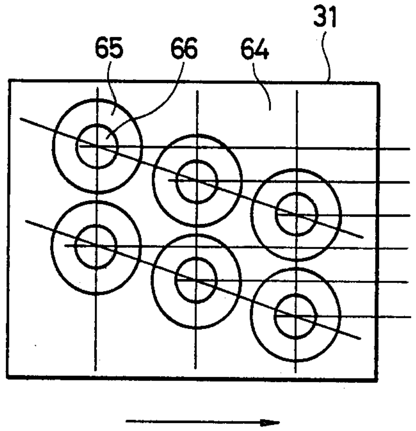
FIG. 10 is an explanatory diagram showing an example of the arrangement of the electromagnet in the recording head, and an example of its print.
Figure 10B:
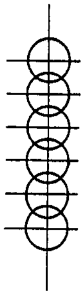

The recording heads 31 shown in FIGS. 5, 7 and 9 are different from those shown in FIGS. 4, 6, 8 and 10 in that the electromagnets 65 are arranged on a plurality of lines inclined with respect to the direction of movement of the recording head, and the electromagnets 65 on an inclined line are shifted in phase from those on the next line. That is, the electromagnets 65 are arranged in a staggered manner. In the recording heads 31 of FIGS. 5 and 7, D=7d, where D is the diameter of the electromagnets 65, and d is the diameter of the electromagnet's printing ends. In the head 31 of FIG. 9, D=5d.

In any one of the recording heads 31 shown in FIGS. 4 through 9, the relation P=d is held, in which P is the line pitch of a plurality of lines which is arranged in parallel with the direction of movement of the recording head and at equal intervals, and d is the diameter of the electromagnet's printing end. In the recording head of FIG. 10, P<d. In FIGS. 4 through 9, holes at two corners of the recording head 31 are used to mount it on the carriage 19.

Figure 11:
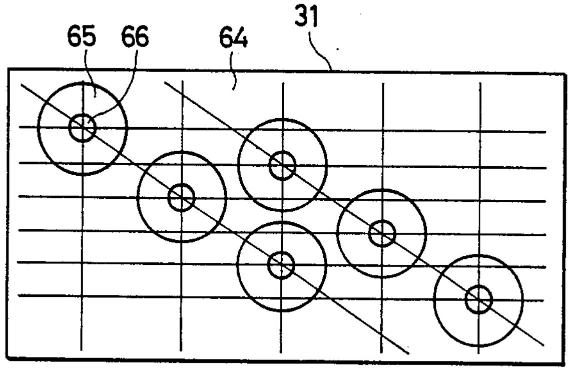

The recording head 31 shown in FIG. 11 is different from those described above in that the numbers of electromagnets 65 on vertical lines perpendicular to the direction of movement of the recording head are different from one another. In the recording head of FIG. 11, similarly as in the recording head of FIG. 2, D=3d where D is the diameter of the electromagnets 65, and d is the diameter of the electromagnet's printing tips.

Figure 12:
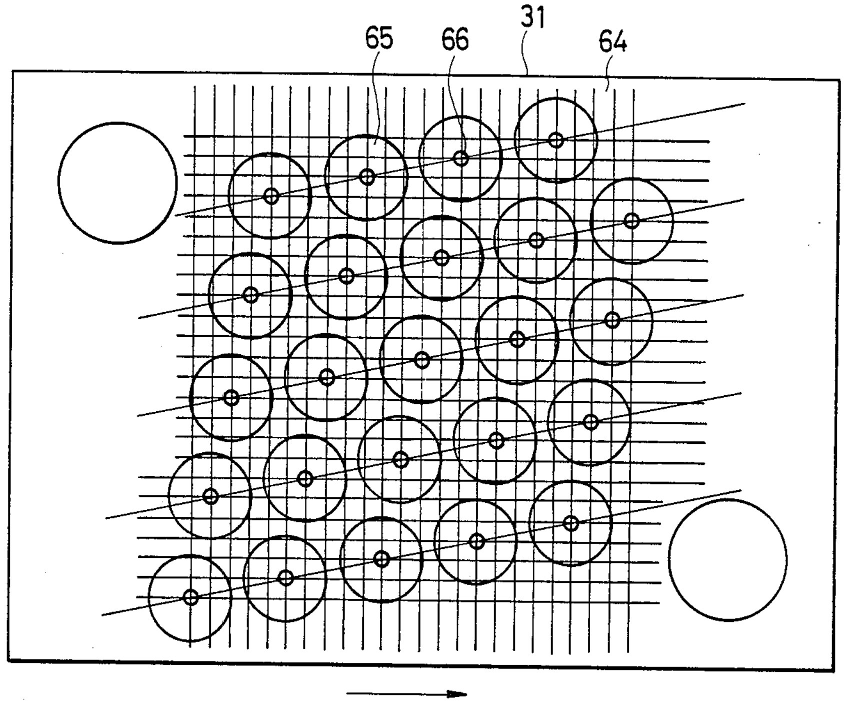

The recording head 31 shown in FIG. 12 is different from those described above in that the electromagnetics 65 are arranged on respective vertical lines, which are perpendicular to the direction of movement of the recording head. In the recording head 31 of FIG. 12, the relations P≦d and 5P=D are held where P is the line pitch of a plurality of lines which are arranged at equal intervals in parallel with the direction of movement of the recording head and where d is the diameter of the electromagnet's printing tip.

The electromagnets 65 and their printing tips 66 may be rectangular. The electromagnets may be spaced at predetermined intervals or may be placed in contact with one another. In FIG. 3 guide rollers 19*a* and 19*b* are mounted on the carriage 19. A Y-direction drive pulley 32 and a Y-direction drive motor 33 drive the Y-direction wire 30.

An erasing head 34 is arranged behind the magnetic panel 1 is such a manner as to cross the rear surface of the panel 1. The erasing head 34 is a permanent magnet provided with guide rollers 35 through 40 over which a wire 41 is laid as shown in FIG. 3. An erasing magnet drive pulley 42 and an erasing magnet drive motor 43 drive the wire 41 for the erasing head 34.

Further in FIG. 3, an external device 44 is in the form of a personal computer, image scanner, facsimile, modem, acoustic coupler, etc. A Centronics interface 45 connects the external device 44 to a bus to which are connected as RS-232C interface 46, a main CPU 47, a character generator controller 48 interfaced with a character generator 49, a RAM 50, a ROM 51 and a parallel interface 52. Another parallel interface 53 connects the first parallel interface 52 to another bus to which are attached a sub CPU 54, a RAM 55, a ROM 56, a stepping motor controller 57 controlling a Y-direction driver 58, an X-direction driver 59, a DC motor controller 60 controlling an erasing head driver 61, and a recording head controller 62 controlling a recording head driver 63.

The operation of the display unit shown in FIG. 3 will now described. The output data of the external device 44 is received through the Centronics interface 45 or the RS-232C interface 46 under the control of the main CPU 47. In the case where the output data thus received are character code data, then the data are converted into dot train data by the character generator controller 48 and the character generator 49.

The dot train data is transferred through the parallel interface 52 controlled by the main CPU 47 to the parallel interface 53 controlled by the sub CPU 54.

In the sub CPU 54, the data train data is subjected to dot rearrangement to provide displaying data according to the staggered arrangement of the electromagnets 65 in the recording head 31. On the other hand, the stepping motor controller 57 controls the Y-direction driver 58 and the X-direction driver 59 to move the recording head 31 to a predetermined position.

As the recording head 31 is moved horizontally (or in the X-direction), the head controller 62 is controlled according to the aforementioned displaying data. That is, the energization of the electromagnets 65 of the recording head 31 is controlled through the head driver 63 so that character and/or figures are displayed on the magnetic panel 1.

In the above-described movement of the recording head 31, the electromagnets 65 arranged as described above are selectively activated to display data with combinations of dots. Therefore, the display unit of the invention can better achieve the display of characters and/or figures than the conventional display unit with a recording head having only one electromagnet, and it can therefore perform a dot display in high concentration. With the recording head having a number of electromagnets 65 as shown in FIGS. 4 through 9, 12, characters such as Kanji (Chinese characters) having many complicated strokes can be displayed in such a manner that they can be more readily read.

As is apparent from the above description, the recording heads 31 employed in the invention can divided into two groups (a) and (b). In the first group (a), the electromagnets 65 are arranged on a plurality of lines inclined with respect to the direction of movement of the recording head 31, and the electromagnets 65 on any one of the lines are shifted in phase from those on the next line. In the second group (b), the electromagnets 65 are similarly arranged on a plurality of lines inclined with respect to the direction of movement of the recording head, but the electromagnets 65 on any one of the lines are in phase with those on the next line.

The recording heads 31 of the grup (b) can be divided into the following two subgroups (b-1) and (b-2). In the subgroup (b-1), the numbers of electromagnets 65 on a plurality of vertical lines perpendicular to the direction of movement of the recording head 31 are equal in number to one another. In the subgroup (b-2), they are different in number. In the electromagnet arrangement of the subgroup (b-1), the number of electromagnets 65 on the vertical lines perpendicular to the direction of movement of the recording head 31 are equal to one another as was described above. Therefore, the electromagnet arrangement of the subgroup (b-1) can reduce the lateral dimension of the recording head 31 when compared with that of the subgroup (b-2).

In the electromagnet arrangement of the group (a), an electromagnet 65 is surrounded by the parallellogram which is formed by connecting the centers of four adjacent electromagnets 65 as indicated by the frame of a solid line in the respective figures. This will makes it possible to arrange the electromagnets 65 with high density to thereby further decrease the lateral dimension of the recording head. As a result, a so-called "dead space" over the magnetic panel where the recroding head 31 travels without printing can be further reduced, and the size of the display unit with respect to the effective display area can thus be decreased.

After all the displays have been accomplished by first scanning the recording head 31 in the main scanning direction X and the repeating the X scanning after displacing it in the sub-scanning direction Y. The DC motor controller 60 controls the erasing head driver 61 to move the erasing head 34 provided on the rear side of the magnetic panel 1. As a result, the magnetic field of the erasing head 34 causes the magnetic particles in the magnetic panel 1 to migrate so that the displayed data is erased.

Figure 13:
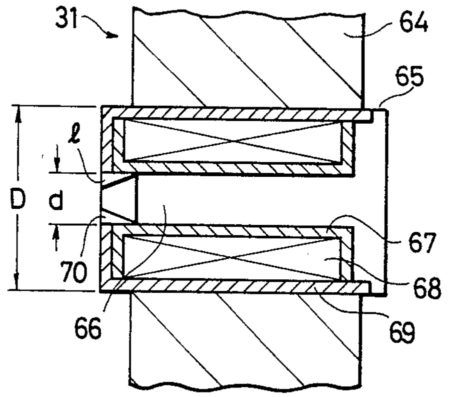
FIG. 13 is a sectional view showing a mounted electromagnet in detail.

A recording head 31 shown in FIG. 13 comprises a board 64 and electromagnets 65 inserted into holes formed in the board 64. Each electromagnet 65 is made up of a core 66 of high magnetic permeability, a bobbin 67 holding the core 66, a coil 68 wound on the bobbin 67, and a bottomed cylindrical yoke 69. The front end of the core 66 is inserted into a hole 70 formed in the bottom of the yoke 69. In this case, it is desirable that the end of the core 66 is flush with the outer surface of the bottom of the yoke 69 and that an annular gap l is formed between the end of the core 66 and the hole 70 formed in the bottom of the yoke 69. Upon excitation of the coil, leakage flux is formed in the annular gap l so as to be applied to the magnetic panel. In this case, the diameter d of the small hole 70 is substantially equal to the size of the printing dot. The inner cylindrical wall of the small hole 70 corresponds to the electromagnet's printing tip 66.

Figure 14:
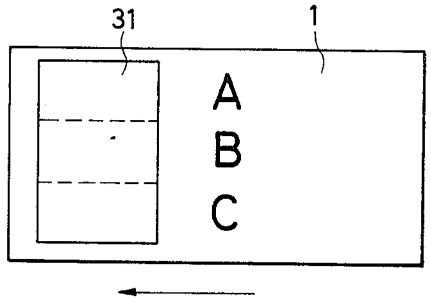
FIG. 14 is a diagram showing another examples of the display unit according to the invention.

In the above-described embodiment, the recording head is applied to a dot matrix type serial display. However, the invention is not limited thereto or thereby. For instance, the display unit may be modified as shown in FIG. 14. In FIG. 14, a line type recording head 31 is used which is formed by arranging the above-described electromagnet arrangements across the magnetic panel 1. If the recording head 31 is moved in the direction of the arrow while the arranged electromagnets are separately energized, then characters and/or patterns can be displayed on the magnetic panel with one movement in the direction of the arrow.

A reading head, which is one of the specific features of the invention, will now be described.

Figure 15:
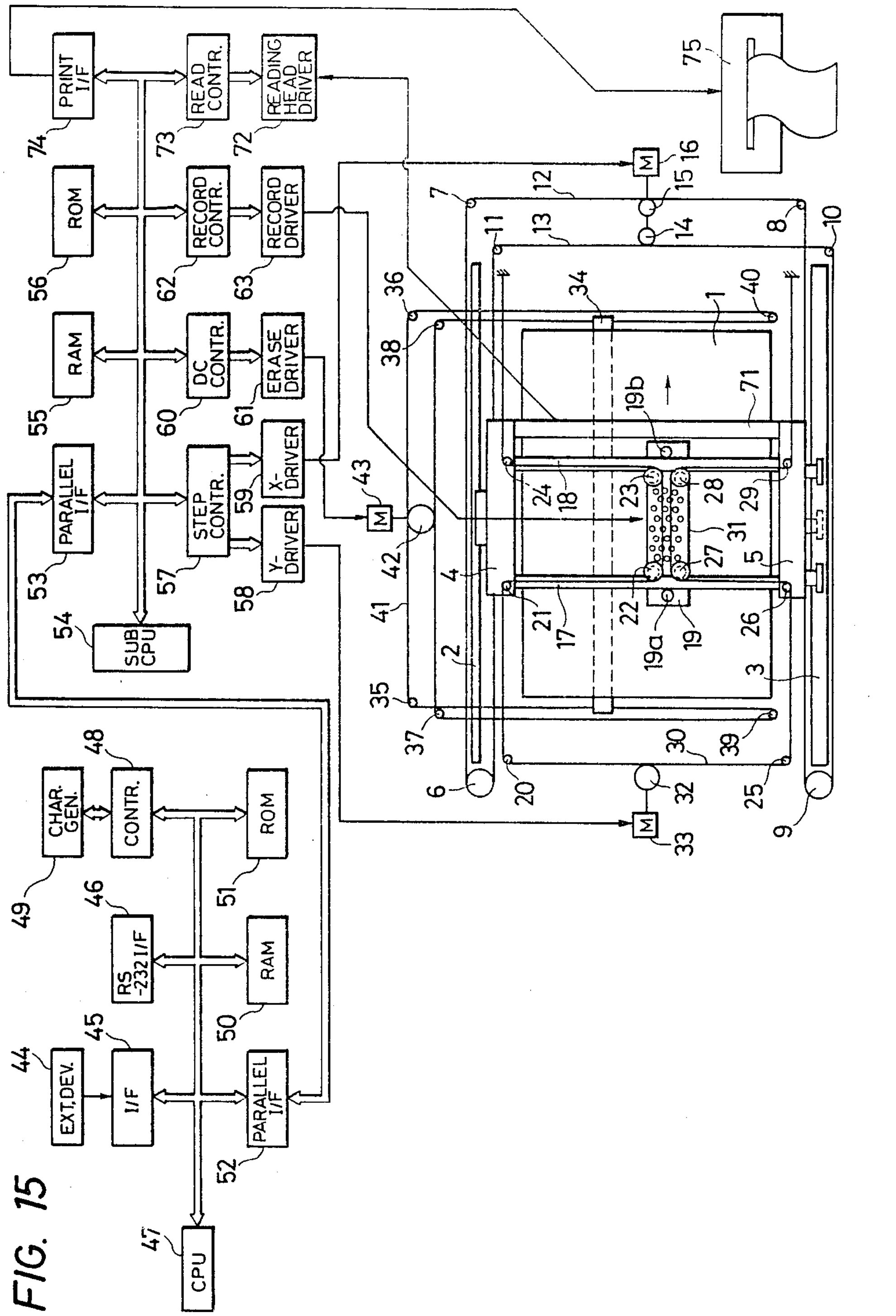
FIGS. 15, 16 and 17 are diagrams showing other examples of the display unit according to the invention.
Figure 16:
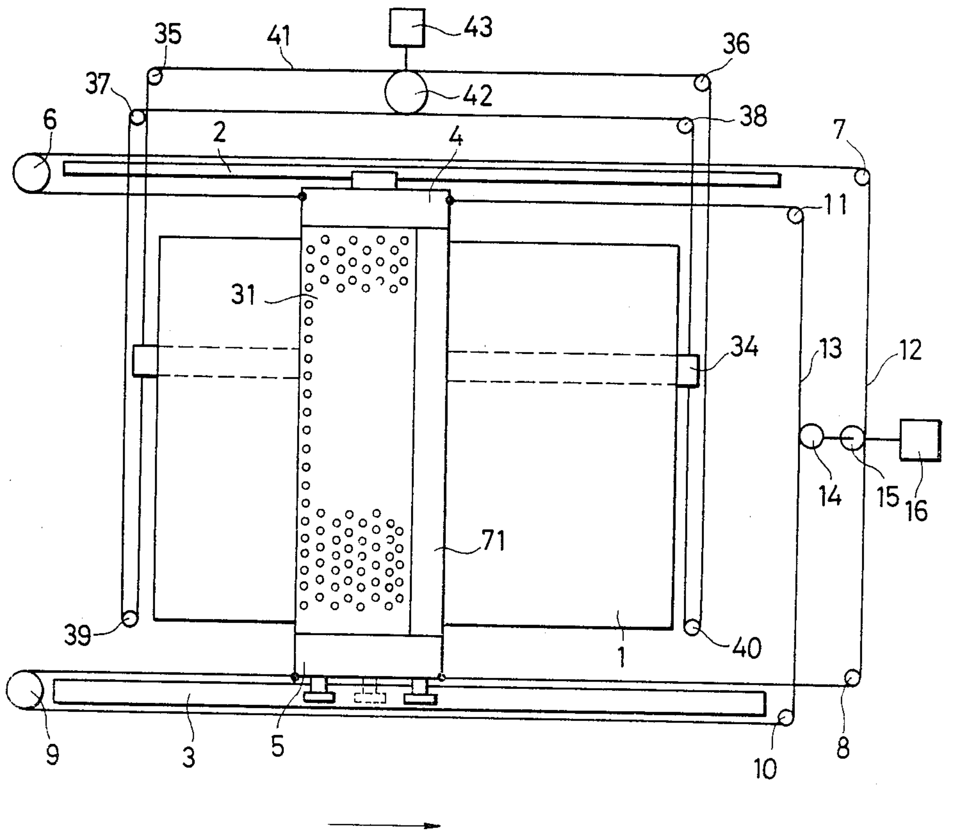
Figure 17:
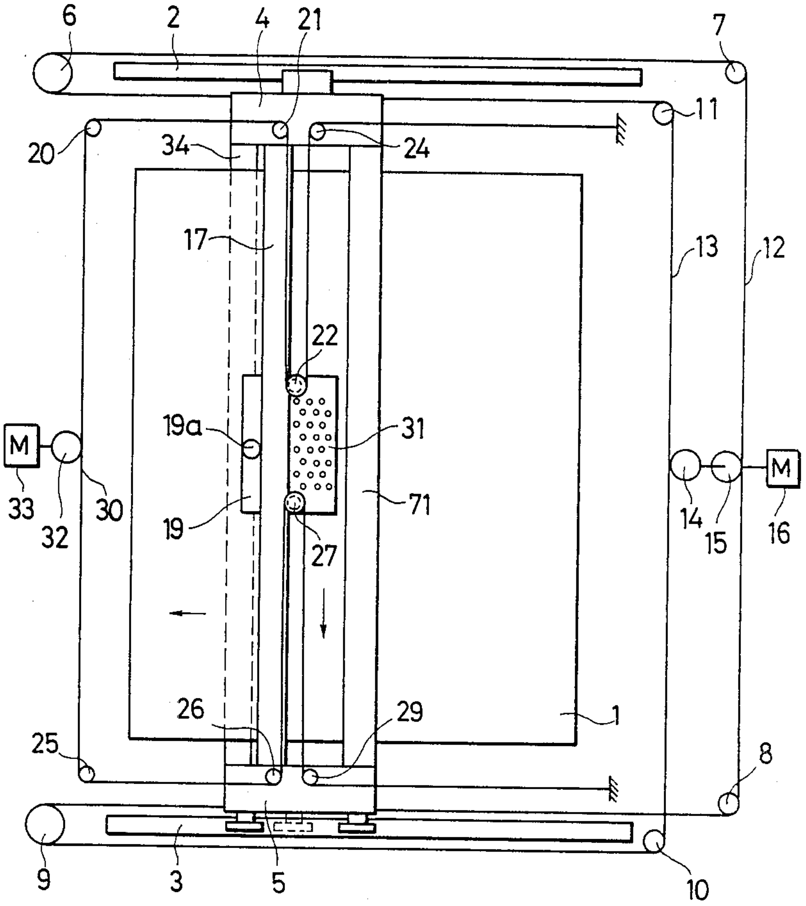

In FIGS. 15, 16 and 17 is shown a reading head 71. the reading head 71 has both ends attached to the slide blocks 4 and 5 so that it is located beside the recording head 31. The reading head 71 is driven in the direction of movement of the recording head 31. Further, FIG. 15 shows in addition to the elements of FIG. 3 a reading head 71, reading head driver 72, a reading head controller 73, a printer interface 74, and a printer 75. The reading head 71 may be formed by arranging photo-transistors or CCDs vertically in the reading head 71 of FIGS. 15, 16 and 17. The printer 75 may be a wire matrix dot printer, heat-sensitive printer or ink jet printer.

Data such as characters and figures on the magnetic panel 1 are read and printed as follows. The reading head driver 72 is driven by the output signals of the reading head controller 73 to move the reading head 71 adapted to convert data on the magnetic panel 1 into electrical signals. As a result, the data are read as the reading head 71 is moved horizontally. The data thus read are temporarily stored in the RAM 55, and printed out by the printer 75. Thus, if data are recorded on the magnetic panel 1 with the recording head 31, and the reading head 71 is driven, then the data can be copied.

If, in this case, a modem and an acoustic coupler are used in combination instead of the printer 75, then the data can be transmitted to a remote location.

In a display unit show in FIG. 17, its direction of movement (or main scanning direction) is an indicated by the arrow. The display unit is different from that shown in FIG. 15 in that the recording head 31 is moved in the main scanning direction by a first motor 33, the recording head 31 and the erasing head 34 are moved in an auxiliary scanning direction perpendicular to the main scanning direction by a second motor 16, and the Y-direction rail 18 and the guide rollers 19*b*, 23 and 28 are eliminated. In the display unit shown in FIG. 17, the erasing head 34 has both ends attached to the slide blocks 4 and 5. The display unit is so designed that the erasing head 34 goes ahead of the recording head 31 while the recording head 31 moves in the auxiliary scanning direction (to the left in FIG. 17).

In the display units of FIGS. 3, 15 and 17, it is preferable that the recording head 31 is held in contact with the magnetic panel 1 to show data clearly. This is because, in the case of a large magnetic panel, it is not uniform in thickness, or the panel itself or its mounting frame is distorted. That is, it is different to maintain the flatness of a large magnetic panel. As a result, a gap is liable to be formed between the panel 1 and the electromagnets 65, thus providing non-uniform display.

This difficulty may be overcome by a method in which a pushing mechanism, including as many springs as the electromagnets, is used to push the electromagnets against the magnetic panel. However, the method raises an other problem that, with the increased number of electromagnets, the construction becomes intricate and accordingly the recording head becomes bulky.

Figure 18:
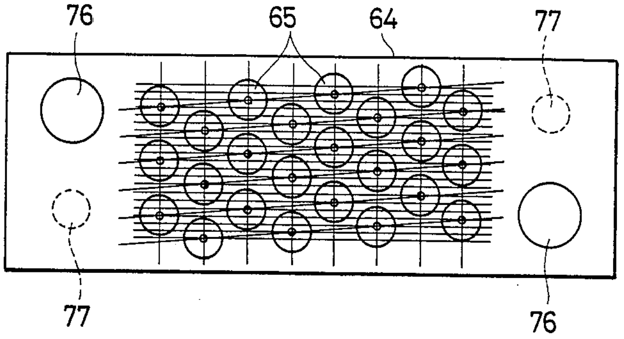
FIGS. 18 through 20 are diagrams for a description of an electromagnet pushing mechanism. More specifically.
Figure 19:
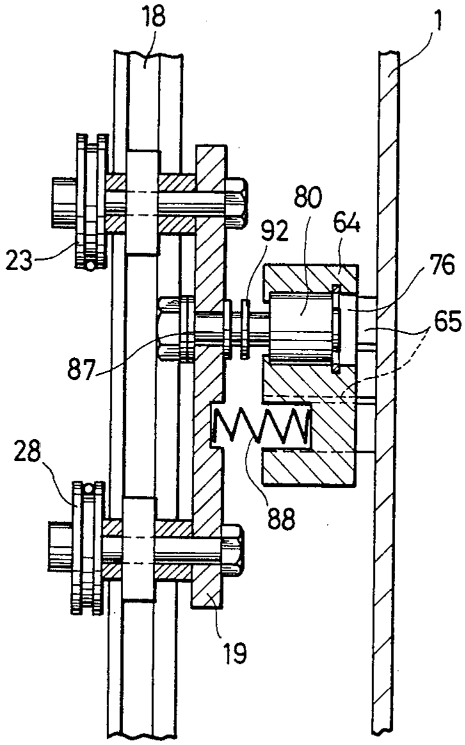
Figure 20:
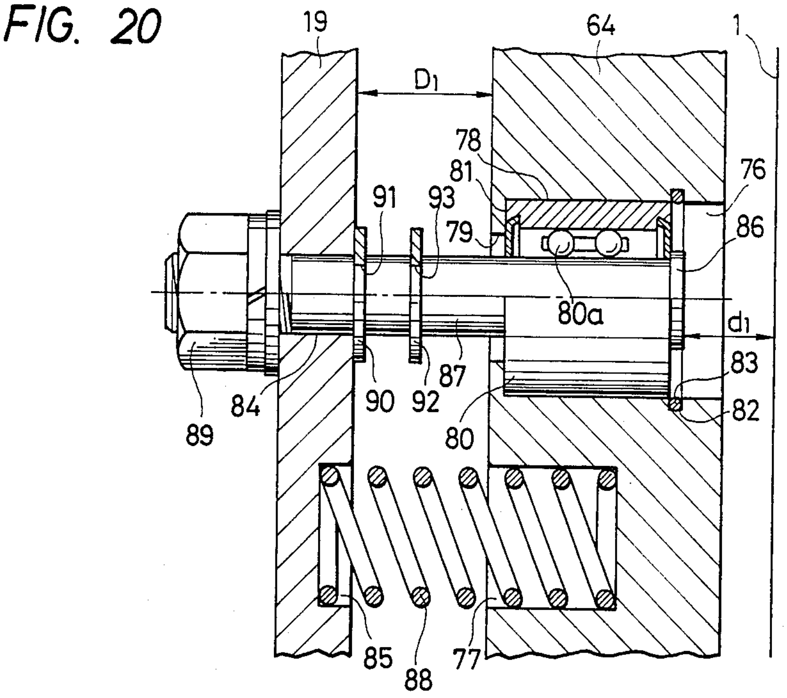

The above-described difficulty can be eliminated by the provision of a display unit as shown in FIGS. 18 through 20 in which a plurality of electromagnets 65 are brought into contact with the magnetic panel 1 with a simple structure. FIGS. 19 and 20 show one example of a structure in which a board 64 show in FIG. 18 is made integral with the carriage 19.

As shown in FIG. 18, thrust bearings 80 are inserted in two through-holes 76 (only one is shown in FIG. 19). Each of the thrust bearings 80 are fixed as follows. The through-hole 76 is so shaped as shown in FIG. 20, so as to have a large diameter part 78 and a small diameter part 79. With the front end face of the thrust bearing 80 abutted against a mounting surface 81 formed by the small diameter part 79, the rear end face of the thrust bearing 80 is locked with a retaining ring 83 engaged with an annular groove 82 formed in the large diameter part 78.

On the other hand, two through-holes 84 and two recesses 85 are formed in the carriage 19 confronting the board 64 in such a manner that the through-holes 84 confront the through-holes 76, and the recesses 85 confront recesses 77 formed in the board 64. A guide bar 87 with a retainer 86 at one end is inserted into the thrust bearing 80. The other end portion of the guide bar 87 is inserted into the through-hole 84 in the carriage 19.

A coil spring 88 is interposed between the recess 77 of the board 64 and the recess 85 of the carriage 19. In FIG. 20, a nut 89 is screwed on the other end portion of the guide bar 87. A C-shaped ring 90 engages an annular groove 91 cut in the guide bar 87. The guide bar 87 is fixedly secured to the carriage 19 with the nut 89 and the C-shaped ring 90.

According to such a structure, the electromagnets 65 are biased by the coil spring 88 through the board 64 to be in contact with the magnetic panel 1. The board 64 moves together with the carriage 19 along the guide bar 87. Two sets of thrust bearings 80 into which the guide bars 87 are employed, thus preventing the rotation of the thrust bearing 80 with respect to the guide bar 87 and accordingly, making it possible for the electromagnets 65 supported on the board 64 to smoothly slide with respect to the magnetic panel 1.

In the case where the thrust bearing 80 is secured to the carriage 19 and the guide bar 87 is fixed to the board 64, the length of the electromagnets 65 is added to the length of the thrust bearing 80, so that the distance between the carriage 19 and the magnetic panel 1 is relatively large. In the case where, on the other hand, the thrust bearing 80 is fixedly fitted in the throughhole 76 in such a manner that it is in parallel with the electromagnets 65, as was described above, the length of the thrust bearing 80 is not added to that of the electromagnets 65. As a result, the distance between the carriage 19 and the magnetic panel 1 can be reduced.

Rollers 80*a* built in the thrust bearing 80 are in contact with the guide bar 87, thus making it possible for the board 64 to be tightly coupled to the guide bar 87 through the thus bearing 80. This will prevent the vibration of the board 64 with respect to the guide bar 87 and accordingly, prevent the oscillation of the electromagnets 65 in displaying characters consisting of dots. Thus, a display of character excellent in quality can be achieved.

The number of the coil springs 88 and the number of the slide mechanisms (80 and 87) depend on the number of the electromagnets 65 and the size of the board 64. In general, two coil springs 88 and two slide mechanisms are employed. However, more than two coils springs and more than two slide mechanissm may be used in combination if necessary.

In the display unit comprising the board 64 supporting the electromagnets 65 of the recording head 31, the thrust bearings 80 are fixed to the board 64 in such a manner that they are in parallel with the electromagnets 65. The guide bars 87 are inserted into the thrust bearings 80 with the carriage 19 holding the outer end portions of the guide bars 87. The springs 88 are interposed between the carriage 19 and the board 64 to push the electromagnets 65 against the magnetic panel 1. Let the underformed distance between a guide bar 87 and the magnetic panel 1 be denoted as the distance $d_1$. This distance $d_1$ correspond to the deflection of the magnetic panel 1 toward the guide bar 87. Assume that the relation $d_1 \leqq D_1$ is held, (where $D_1$ is the underformed distance between the board 64 and the carriage 19). If, in this situation, the guide bars 87 guide the thrust bearings 80 over a distance equal to or greater than the distance $d_1$, then the guide bars 87 will strike the magnetic panel 1 so that the surface of the magnetic panel 1 may be damaged.

This difficulty may be eliminated by a method in which, between the board 64 and the carriage 19, a stopper is mounted on each of the guide bars 87 so that it abuts against the lower surface of the board 64 to allow the thrust bearing 80 to move slightly less than the distance $d_1$. In FIG. 20 such a stopper 92 in the form of a ring is fitted in an annular groove 93.

Also in the display unit shown in FIG. 14, it is preferable that the recording head 31 is brought into contact with the magnetic panel 1 to provide a clear display.

A display unit shown in FIGS. 21 through 26 is so designed that the recording head is brought into contact with the magnetic panel, thus satisfying the above-described requirement.

Figure 21:
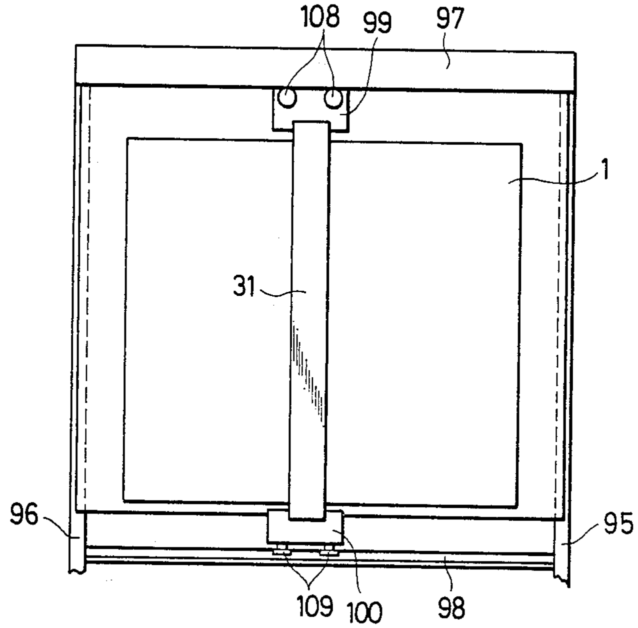
FIGS. 21 through 26 are diagrams for a description of a mechanism for contacting the recording head with the magnetic panel. More specifically.

As shown in FIG. 21, the magnetic panel 1 is covered by a liner 94 of non-magnetic material. The liner 94 is supported at both ends by two supporting bars 95 and 96 which form a part of a frame. Guide rails 97 and 98 are laid above and below the magnetic panel 1, respectively, and are connected to the supporting bars 95 and 96. Movable blocks 99 and 100 are mounted on the guide rails 97 and 98, respectively. Both ends of a belt-shaped recording head 31 are secured to the movable blocks 99 and 100 so that the recording head is movable in the longitudinal direction of the magnetic panel 1.

Figure 22:
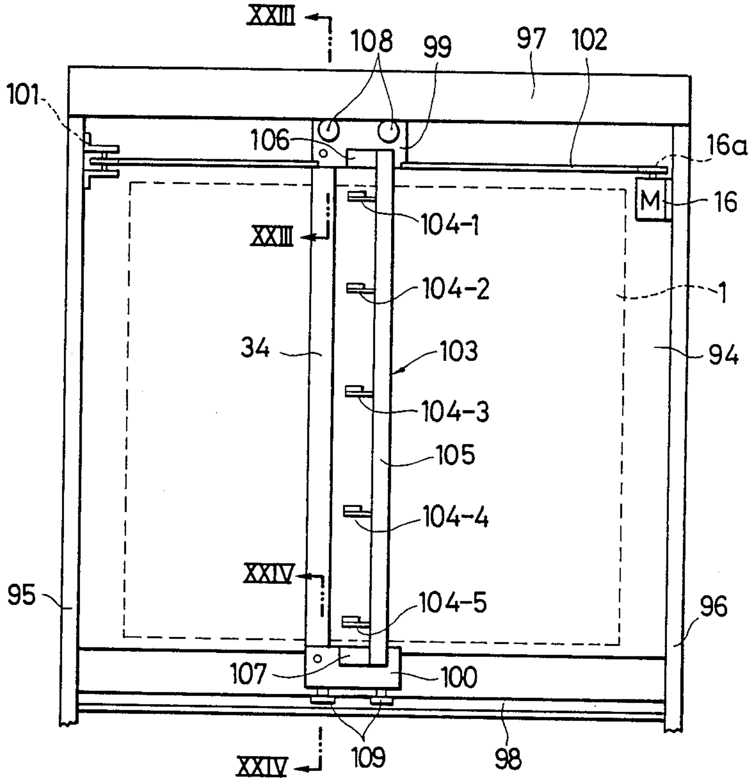

FIG. 22 is a rear view of the display unit shown in FIG. 21. A pulley 101 is attached to the supporting bar 95, and the motor 16 is fixedly mounted on the supporting bar 96. A belt 102 is laid over the pulley 101 and a pulley 16a of the motor 16 and is then connected to the movable block 99. The erasing head 34 has both ends secured to the movable blocks 99 and 100 so that it is juxtaposed with a pushing roller device 103.

As shown in FIG. 22, the pushing roller device 103 is made up of pushing rollers 104-1 through 104-5 and a mounting bar 105. Both ends of the mounting bar 105 are secured to mounting stands 106 and 107 which are respectively secured to the movable blocks 99 and 100. In such a manner that a predetermined distance is provided between the mounting bar 105 and the magnetic panel 1.

Figure 23:
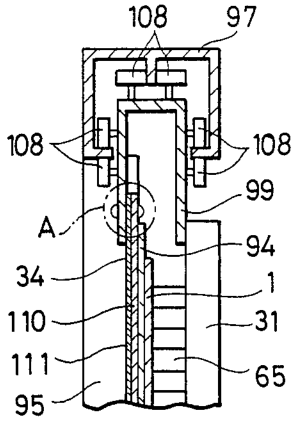
Figure 24:
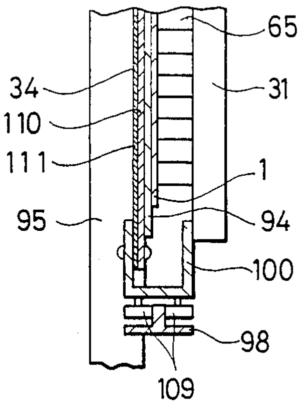

FIGS. 23 and 24 are enlarged sectional views taken along lines XXIII—XXIII and XXIV—XXIV in FIG. 22, respectively. As shown in FIG. 23, the guide rail 97 is substantially in the form of a hollow quadrangular prism with an open side. The movable block 99 is substantially U-shaped in section. The movable block 99 is hung on the guide rail 97 through a plurality of rollers 108. On the other hand, as shown in FIG. 24, the guide rail 98 is substantially T-shaped in section and the movable block 100 is substantially U-shaped in section. The movable block 100 is hung on the guide tail 98 through a plurality of rollers 109.

FIGS. 23 and 24 shows a section of the erasing head 34 whose magnet 110 is coupled to the upper surface of a yoke 111. The magnet 110 and the yoke 111 are made of a rubber magnet and a soft steel plate, respectively, so that the erasing head 34 is flexible as a whole. In other words, it, being deformed by the force of attraction between the magnetic particles in the magnetic panel, is brought into close contact with the magnetic panel 1.

Figure 25:
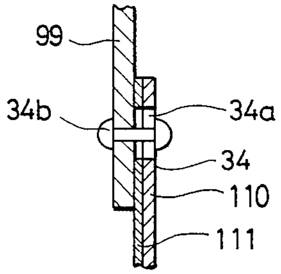

FIG. 25 is an enlarged sectional view of the part A in FIG. 23. With a pin **34*b* fitted loosely in an elongated hole 34*a* formed in one end portion of the erasing head 34, the erasing head 34 is connected to the movable block 99 so that the erasing head 34** can move slightly when deformed in the above-described manner.

Figure 26:
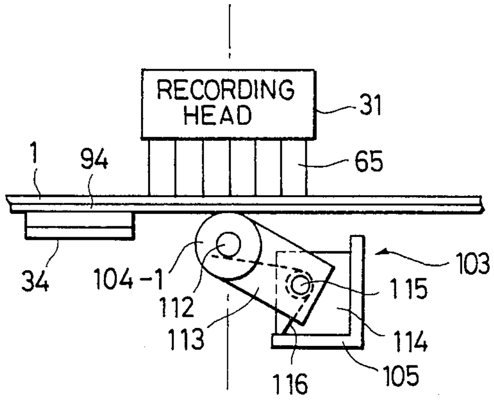

The above-described pushing roller 104-1, as shown in FIG. 26, is rotatably coupled to a bearing board 113 through a shaft 112. The board 113 is swingably coupled to a horizontal board 114 through a shaft 115. the horizontal board 114 is secured to the mounting bar 105, which is L-shaped in section. A spring 116 is wound on the shaft 115 in such manner that its one end abuts against the inner surface of the mounting bar 105 while the other end abuts against the shaft 112 so that the pushing roller 104-1 is pushed against the magnetic panel 1. The above description is applicable also to the remaining pushing roller 104-2 through 104-5.

FIG. 26 indicates the positional relationship between the belt-shaped recording head 31 and the erasing head 34. The pushing rollers 104-1 through 104-5 are positioned along a center line l' of the belt-shaped recording head 31 so that they are brought into close contact with the magnetic panel 1. The erasing head 34 is shifted from the recording head 31 so that the mutual interference between the displaying magnetic field and the erasing magnetic field is prevented.

In the display unit thus constructed, as the belt 102 is driven by the motor 16, the recording head 31, the erasing head 34, and the pushing roller device 103 are moved together.

When the erasing head 34 is moved from the supporting bar 95 (the home position of the erasing head) towards the other supporting bar 96, then even if the rear surface of the magnetic panel 1, i.e., the liner 94, is bent, the erasing head 34 is deformed by the force of attraction between the magnetic particles in the magnetic panel 1 and is thus brought into close contact with the surface of the liner 94. As a result, the display on the magnetic panel is satisfactorily erased.

Thereafter, while the belt-shaped recording head 31 is moved towards the home position (namely, the supporting bar 95) from the supporting bar 96, the electromagnets 65 are selectively energized according to a pattern to be displayed. As a result, a number of dot characters can be simultaneously displayed on the magnetic panel 1.

In this operation, since the erasing head 34 is positioned away from the recording head 31 as was described above, the erasing head 34 goes ahead of the recording head 31, thus causing no trouble in display.

Because the pushing roller device 103 adapted to push the magnetic panel 1 against the belt-shaped recording head 31 is provided on the rear surface of the magnetic panel 1, the magnetic panel 1 is brought into close contact with the recording head 31. Therefore data are displayed clearly.

The pushing roller device 103 may be replaced by other means capable of pushing the magnetic panel 1 against the belt-shaped recording head 31. For instance, one elongated roller may be used in such a manner that its two ends are elastically depressed so that the roller is brought into line contact with the magnetic panel 1. However, the pushing roller device of the invention comprising a plurality of pairs of springs 116 and pushing rollers 104 which push the magnetic panel 1 individually is advantageous in the following points. Even in the case where the magnetic panel 1 is slightly variable in thickness with both its sides curved inwardly, the magnetic panel 1 can be satisfactorily brought into close contact with the belt-shaped recording head 31. Furthermore, since the pushing rollers 104 are brought into point contact with the rear surface of the panel 1, the resistance in movement of all the pushing rollers 104 is low. That is, a load for the drive source can be reduced and the display speed can be increased.

The display unit shown in FIG. 16 can display data on its magnetic panel and read the data. Therefore, it can be utilized as an educational device which is adapted to display data for study and then to copy the data. However, the display unit still suffers from a difficulty that the mechanism for renewing a display is rather intricate. This will be described in more detail. Before a new display is made, the present display must be erased. In the magnetic panel 1, the display is erased by an erasing magnetic field applied to the display panel 1 from behind. If, in this operation, it were necessary to move the erasing head 34 after movement of the recording head 31 and the reading head 71 to predetermined positions, then it would be necessary to use different drive systems for the recording head 31 and the reading head 71, and for one erasing head 34. That is, the construction would be come more intricate.

Figure 27:
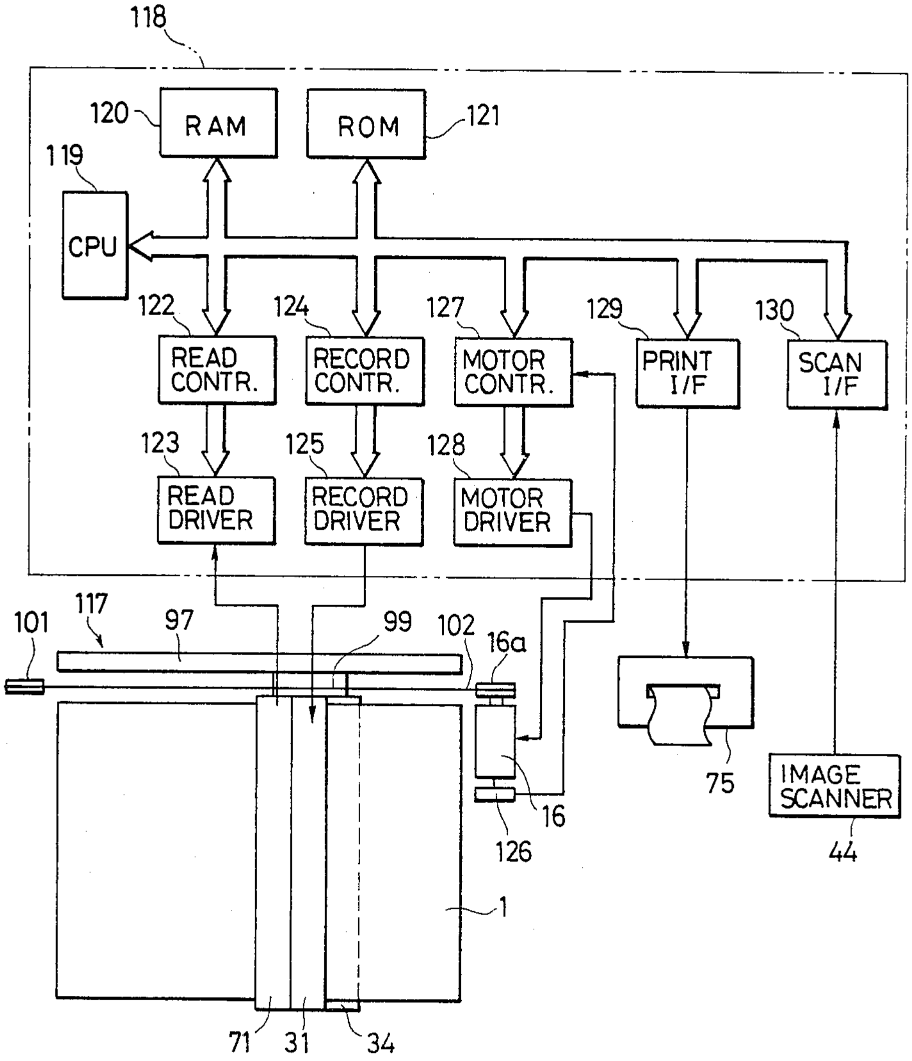
FIG. 27 is a block diagram showing another example of the display unit according to the invention.
Figure 28:
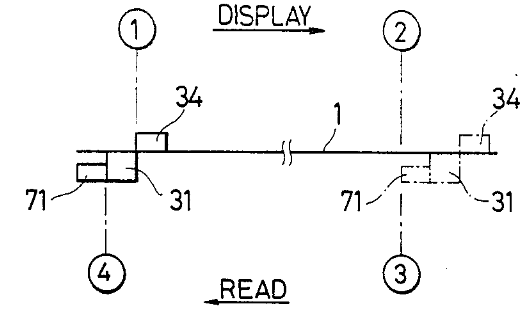
FIG. 28 is an explanatory diagram, with the middle part omitted, showing the positional relationship between the recording head, the reading head and the erasing head.
Figure 29:
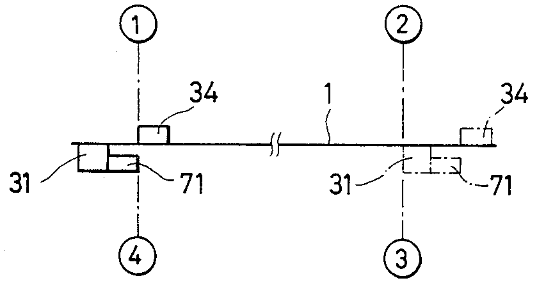
FIG. 29 is an explanatory diagram, with the middle part omitted, showing another example of the positional relationship between these heads.

This difficulty can be overcome by the provision on a display unit as shown in FIGS. 27 through 29. In this display unit, only one drive system is used to reciprocate the recording head 31, the reading head 71 and the erasing head 34 along the magnetic panel 1. During this reciprocation, data are displayed on the magnetic panel 1 and read. The data are erased in a manner that the reading operation is not obstructed by the erasing operation.

FIG. 27 is a block diagram showing the arrangement of the display unit. In FIG. 27 are shown the magnetic panel 1, the recording head 31, the reading head 71 and the erasing head 34. Further in FIG. 27 a moving device 117 moves the recording head 31, the reading head 71 and the erasing head 34 in the same direction. A movable block comprising the heads 31, 71 and 34 is hung on the guide rail 97. The belt 102 for moving the movable block 99 is laid over pulley 16a and 101 and the pulley 16a is driven by the motor 16.

Further in FIG. 27, an image scanner 44 reads through photo-electric conversion the data written on a sheet of manuscript paper. A printer 75 prints out the data read from the magnetic panel 1. A control section 118 controls the display unit, printer 75 and image scanner 44. The control section 118 comprises a CPU 119, a RAM 120, a ROM 121, a reading head controller 122, a reading head driver 123, a recorder head controller 124, a recording head driver 125, an angle encoder 126 on the motor 16, a motor controller 127, a motor driver 128, a printer interface 129, and a scanner interface 130.

FIG. 28 is an explanatory diagram showing the positional relationships between then heads 31, 71 and 34. In FIG. 28, reference symbol (1) designates the start position of a predetermined display and (2) designates the end position of the same. The reading head 71, the recording head 31, and the erasing head 34 are arranged in the stated order in a direction from the display start position (1) to the display end position (2).

The reading head 71 is slightly spaced apart from the magnetic panel 1. The recording head 31 is in contact with the magnetic panel 1 so as to apply the displaying magnetic field satisfactorily to the magnetic panel 1. In FIG. 28, reference symbols (3) and (4) designate the start position and end position of a reading operation, respectively.

The operation of the display unit thus constructed will be described.

(1) Operation of reading data on a sheet of manuscript paper:

Data written on a sheet of manuscript paper are read by the image scanner 44, which outputs a read signal.

(2) Operation of displaying data on the magnetic panel:

The output read signal of the image scanner 44 is received through the scanner interface 130 controlled by the CPU 119. The read signal thus received is converted into dot train data, which are temporarily stored in the RAM 120. The motor controller 127 controls the motor driver 128 to thereby move the recording head 31 from the display start position (1) towards the display end position (2). In this operation, the recording head controlled 124 processes the aforementioned dot train data so that the electromagnets of the recording head 31 are selectively activated.

In this operation, the erasing head 34 together with the reading head 71 follows the movement of the recording head 31. However, it should be noted that the erasing head 34 goes ahead of the recording head 31. Therefore, upon application of the displaying magnetic field to the magnetic panel 1, the magnetic particles in the magnetic panel 1 are collected onto side of the transparent substrate so that characters and/or figures are formed with dots on the contrast between the color of the magnetic particles and the dispersion liquid.

(3) Operation of reading data displayed on the magnetic panel, and erasing the data:

When it is required to read and copy characters figures, etc. displayed on the magnetic panel 1, the recording head 31 is moved from the display end position (2) to the display start position (1), and the reading head 71 is moved from the reading start position (3) towards the reading end position (4). In this operation, the reading head driver 123 is opeated by the output signal of the reading head controller 122 so that the data displayed on the magnetic panel 1 are read in synchronization with the output signal of the encoder 126 on the motor 16 and temporarily stored in the RAM 120.

The erasing head 34 follows the movement of the recording head 31 and the reading head 71. However, the erasing head 34 trails the reading head 71 during the reading operation. Therefore, when the reading head 71 has reached the reading end position (4) to accomplish its reading operation, erasing the displayed data is ended.

(4) Operation of copying data:

The content of the RAM 120 is read out and inputted through the printer interface 129 to the printer 75. As a result, the characters, figures, etc. displayed on the magnetic panel 1 are copied onto a predetermined sheet.

That is, in the above-described embodiment, the reading head 71, the recording head 31 and the erasing head 34 are arranged in the stated order in a direction from the displaying end position (2) towards the display start position (1) so that the data displaying operation, data reading operation and data erasing operation can be performed while these heads are reciprocated along the magnetic panel 1 with only one drive unit 16.

FIG. 29 is an explanatory diagram showing another example of the positional relationships between these heads. In this case also, the data displaying operation, data reading operation, data erasing operation and data copying operation can be performed similarly as in the above-described case.

Figure 30:
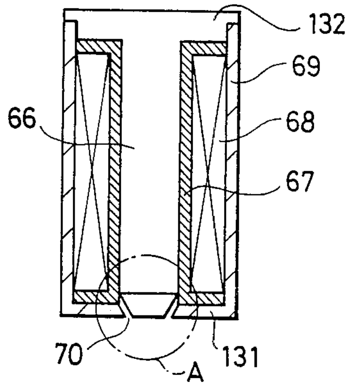
FIG. 30 is a sectional diagram showing one example of an electromagnet improved according to the invention.
Figure 31:
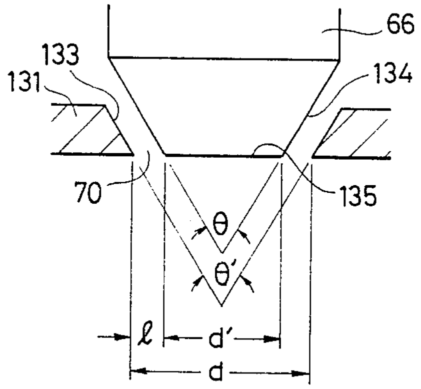
FIG. 31 is an enlarged sectional view showing the part A in FIG. 30.

FIG. 30 is a section views showing one example of an electromagnet improved according to the invention. FIG. 31 is a detailed view of circled are A of FIG. 30. In FIGS. 30 and 31 are shown the bottomed cylindrical yoke 69, a bottom 131 of the the yoke 69, which is a thin magnetic plate, the hole 70 having diameter of d (for instance 1.5 mm), the coil 68, the bobbin 67, the iron core 66, and a flange 132 of the core 66 which is brought into contact with the yoke 69. The core 66 is inserted into the bobbin 67 in such a manner that the end face of a tapered end portion 134 of the core 66 is flush with the outer surface of the bottom 131. An annular gap l (0.25 mm for instance) is formed between the cylindrical wall of the hole 70 and the tapered end portion 134.

Upon application of current to the coil 68, leakage flux is formed in the gap l. The tapered end portion 134 of the core 66 is positioned in the hole 70 having the inwardly tapered wall 133 and the relation $\theta' \geqq \theta$ is maintained, where $\theta'$ is the taper angle of the cylindrical wall 133 of the hole 70 and $\theta$ is the taper angle of the tapered end portion 134. Then, in this case, the magnetic flux formed by the coil 68 can be led to the end of the core with high efficiency. In FIG. 31 an end face 135 of the core 66 has a diameter of d' (1.0 mm for instance).

Figure 32:
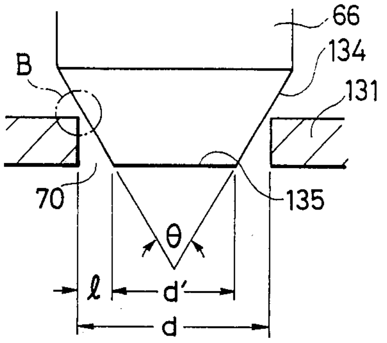
FIG. 32 is an enlarged sectional view showing essential component of a comparison example of the electromagnet.

FIG. 32 shows an electromagnet as a comparison example. In FIG. 32, those components which have been already described with reference to FIGS. 30 and 31 are therefore designated by the same reference numerals or characters. The electromagnet of FIG. 32 is different from that of FIG. 30 in that the tapered end portion of the core 66 is inserted into a hole 70 whose cylindrical wall is not tapered.

Figure 33:
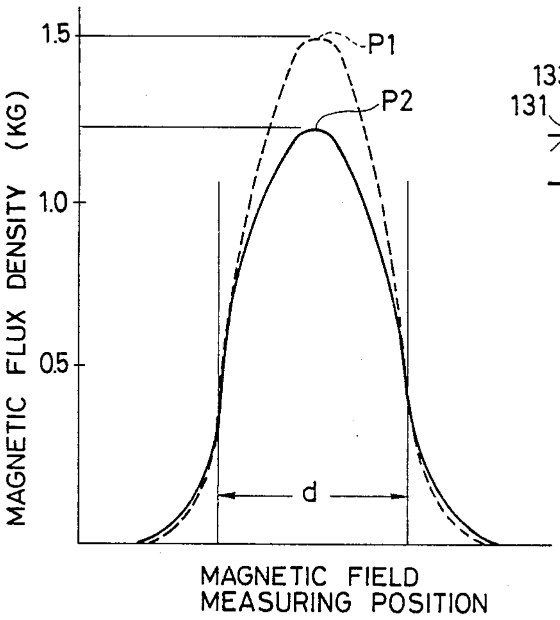
FIG. 33 is a graphical representation indicating the magnetic field distributions of the electromagnets shown in FIGS. 30 and 32.

FIG. 33 shows the magnetic field distributions of the electromagnets shown in FIGS. 30 and 32. In FIG. 33, the dotted line indicates the experimental results of the eletromagnet of the invention shown in FIG. 30 and the solid line indicates those of the comparison electromagnet shown in FIG. 32. The diameter d of the hole 70 is illustrated in FIG. 33. As is apparent from FIG. 33, the comparison electromagnet of FIG. 32 has a force of attraction higher than a certain value large enough to act on the magnetic particles in the magnetic panel 1. However, the peak P2 of its distribution is lower by about 20% than the peak P1 of the distribution of the magnet of the invention shown in FIG. 30.

The reason for this is believed to be as follows. In the comparison electromagnet of FIG. 32, the tapered end portion 134 of the core 66 is inserted in to the hole 70 whose cylindrical wall is not tapered so that the gap l is smaller towards the part B in FIG. 32. The magnetic resistance is a minimum at the part B and accordingly the flux if concentrated at the part B. On the other hand, in the electromagnet of the invention of FIG. 30, $\theta' \geqq \theta$ is established as was described above. Therefore, no narrow path such as the part B in FIG. 32 is formed. The gap is uniform in width or it is formed in such a manner that is is smaller towards the outer surface of the bottom of the yoke 69. This will prevent the decrease of magnetic flux concentrated at the end of the core 66.

As is apparent from the above description, the electromagnet of FIG. 30 in which the hole formed in the magnetic thin plate has the inwardly tapered cylindrical wall and $\theta' \geqq \theta$ is held where $\theta'$ is the taper angle of the cylindrical wall, and $\theta$ is the taper angle of the tapered end portion of the core can lead. Thus, the magnetic flux is generated by the coil to the end of the core with high efficiency.

In the above-described electromagnet, the end face of the tapered end portion of the core is flush with the outer surface of the bottom of the yoke. However, the invention is not limited thereto or thereby. That is, the core may be inserted in other manners as long as the relation $\theta' \geqq \theta$ is satisfied.

Figure 34:
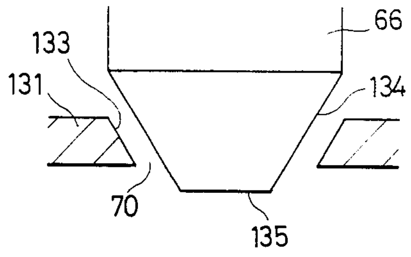
FIGS. 34 and 35 are enlarged sectional views showing essential components of respective modifications of the electromagnet according to the invention.

FIG. 34 shows another example of the electromagnet. This electromagnet is different from that of FIG. 30 only in that the tapered end portion 134 of the core 66 is slightly projected from the outer surface of the magnetic thin plate 131.

Figure 35:
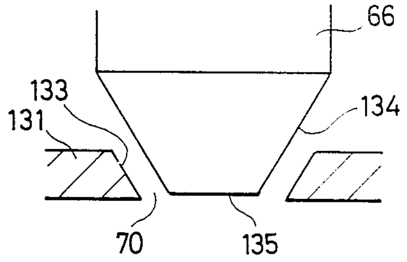

FIG. 35 also shows yet another example of the electromagnet. This electromagnetic is different from that of FIG. 30 only in that the end face of the tapered end portion 134 of the core 66 is slightly retracted from the outer surface of the magnetic thin plate 131.

In the above-described electromagnets the bottom of the bottomed cylindrical yoke is the magnetic thin plate. However, the invention is not limited thereto or thereby. That is, the end portions of a plurality of cores inserted into bobbins on which coils are wound may be inserted into a plurality of holes formed in a magnetic thin plate, as is shown in FIG. 36.

Figure 36:
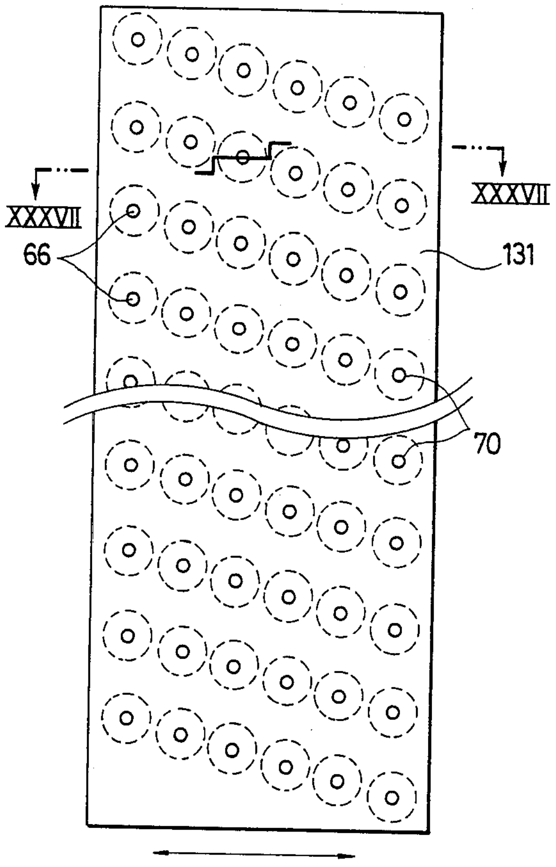
FIG. 36 is a front view showing one example of the recording head according to the invention.

FIG. 36 is a front view of a recording head suitable for the display units shown in FIGS. 14, 16, 21 and 27. In FIG. 36, a number of holes 70 are arranged in matrix form in a magnetic thin plate 131. Cores 66 are plaed in the holes 70. The holes 70 are positioned respectively on lines which are arranged in parallel with the direction of movement of the recording head (indicated by the arrow) and at equal intervals.

Figure 37:
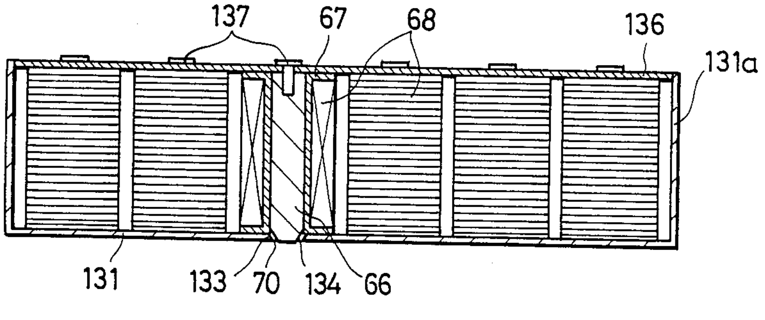
FIG. 37 is an enlarged sectional view taken along line C—C in FIG. 36.

FIG. 37 is enlarged sectional view taken a long line C—C in FIG. 36. In FIG. 37 are shown the inwardly tapered wall 133 of each of the holes 70, the coil 68 surrounding the bobbins a mounting board 136 and mounting screws 137.

Figure 38:
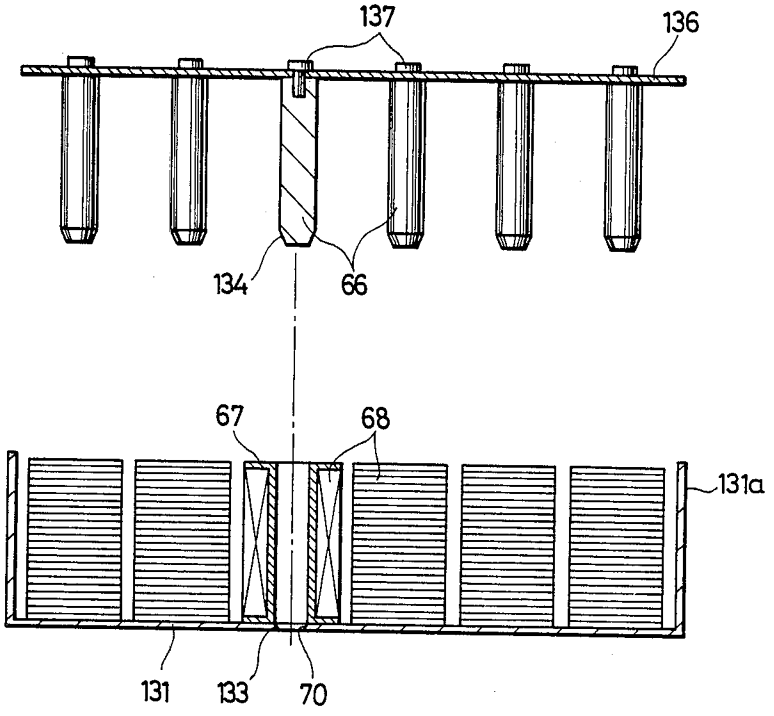
FIG. 38 is an exploded view of the recording head shown in FIGS. 36 and 37.

In the recording head shown in FIG. 38, one end face of each of a number of bobbins 67, on which the coils 68 have been wound, are fixedly secured to the inner surface of the magnetic thin plate 131 in such a manner that the central hole of the bobbin 67 is communicated with the respective hole 70. The other end face of each of the bobbins 67 is abutted against the mounting board 136. On the other hand, an number of cores 66 are secured to the mounting board 136 with screws in such a manner that they are arranged in matrix form. Thereafter, the cores 66 are inserted into the central holes of the bobbins 67 so that the tapered end portions 134 of the cores 66 are inserted in the respective holes 70 of the magnetic thin plate 131. As is apparent from the above description, in the recording head, the cores 66 are mounted with both end faces of each bobbin 67 as reference surfaces. Therefore, the tapered end portions 134 of the cores can be positioned accurately with respect to the holes 70 of the magnetic thin plate 131, with the gaps l accurately maintained. The recording head is simple in construction and can be assembled readily. In FIG. 38, bent parts 131*a* of the magnetic thin plate 131 are in contact with the mounting board 136 so as to form a closed magnetic path.

In the above-described recording head, the holes formed in the magnetic thin plate have the inwardly tapered cylindrical wall and the relation $\theta' \geqq \theta$ is held, where $\theta'$ is the taper angle of the cylindrical wall and $\theta$ is the taper angle of the tapered end portion of the core. Therefore, the magnetic flux generated by the coils can be led to the core ends with high efficiency. In addition, the recording head with the electromagnets can be made compact, and the power consumption can be reduced.

Figure 39:
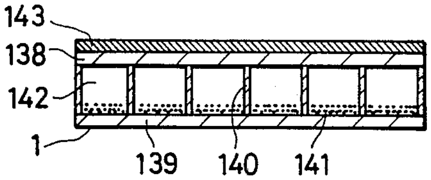
FIGS. 39, 40 and 41 are sectional views of respective examples of a magnetic panel having a transparent nonpolar polymer sheet on its surface.
Figure 40:
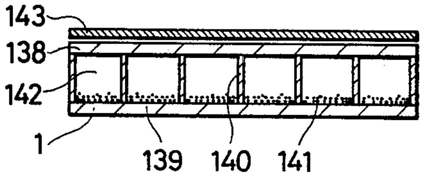
Figure 41:
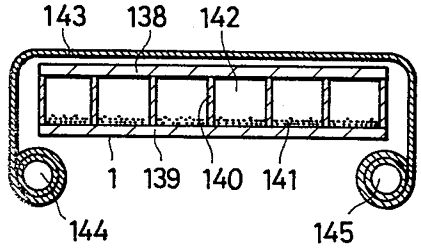

In the above-described display unit, the magnetic panel made up of two substrates is enclosed with the dispersion liquid in which magnetic particles are dispersed. This magnetic panel may be provided with a transparent non-polar polymer sheet or layer. More specifically, the layer may be laid over the surface of the magnetic panel as shown in FIGS. 39 through 41.

In general, the magnetic panel is designed as follows. A number of cells are formed between two substrates, namely a transparent polymer top substrates and a bottom substrate. The cells are filled with a colored dispersion liquid. Magnetic particles which are caused to migrate by magnetic field are dispersed in the colored dispersion liquid.

Recently, the transparent polymer top substrate has been made of a polar polymer such as polyvinyl chloride resin or polyester because it satisfies the following conditions. (1) It is stable against the colored dispersion liquid. (2) It is tough enough to withstand a local pressure given by the magnetic pen. (3) It can be bonded to a multi-cell structure. (4) It is high in transparency. (5) It does not degrade at ambient temperatures.

However, the top substrate made of polar polymer suffers from the following difficulty. If characters or the like are written on it with an ordinary white board marker, then the ink in the marker adheres to the polarizing polymer. As as result, the hand writing cannot be erased at all. Even if it were erased, its stain would remain. Thus, the top substrate of polar polymer is unsuitable for ink marker display. Furthermore, in case the surface on which ink is to be applied is not non-polar, even if the ink is adjusted to be low in surface tension and high in a vapor pressure, a large affinity remains between the surface and ink particles after the ink has been dried. Therefore, the ink cannot readily be wiped off with an erasing member of cloth or paper.

FIGS. 39, 40 and 41 show examples of the magnetic panel which is suitable for ink marker display. In FIG. 39, a top substrate 138 of transparent polar polymer and a bottom substrate 139 enclose a multi-cell structure 140. Magnetic particles 141 in multi-cell structure 140 migrate under the influence of a magnetic field. The magnetic particles 141 are dispersed in a colored dispersion liquid. A transparent non-polar polymer sheet 143 is laminated on the top substrate 138.

FIG. 40 shows another example of the magnetic panel over which the tranparent non-polar polymer sheet 143 is laid. THe sheet 143 is laid over the top substrate 138 so that it can be replaced when necessary.

FIG. 41 shows another example of the magnetic panel over which the transparent non-polar polymer sheet 143 is laid. More specifically, the polymer sheet 143 is movably laid over the top substrate 138. In FIG. 41, the polymer sheet 143 is wound by a sheet winding roll 144 from a sheet supplying roll 145. In the magnetic panel with the transparent non-polar polymer sheet 143, a new writing surface can be provided over the top substrate of the magnetic panel by winding the sheet on the roll.

In the magnetic panels thus constructed, after data are displayed with the recording head, characters or the like are written on the transparent non-polar polymer sheet 143 with an ordinary white board marker. The handwriting can be quickly erased with an eraser of cloth or paper.

If the top substrate 138 is made of polar polymer such as polyvinyl chloride resin or polyester, light from an external light source is reflected by the inner and the outer surface of the top substrate. As a result, the phenomenon takes place that is it difficult for a person to observe characters or figures displayed on the magnetic panel 1 depending on his position. That is, a so-called "halation" takes place. This will be described in more detail.

Figure 42:
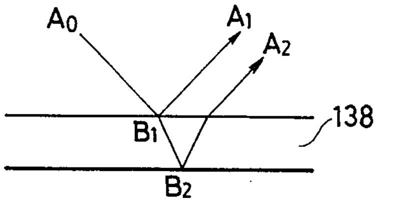
FIG. 42 is a sectional view showing the transparent substrate of the magnetic panel as a comparison example.

As shown in FIG. 42, a light beam $A_0$ applied from an external light source such as fluorescent lamp in a room is reflected by the top substrate 138 at points $B_1$ and $B_2$ on its top and bottom surfaces, thus providing two reflected light beams $A_1$ and $A_2$ which obstruct the visual reading of the characters and figures on the magnetic panel 1. This is because the refractive indices of polyvinyl chloride resin and the polyester forming the top substrate 138 are relatively large, 1.53 and 1.65, and the degree of dispersion of the reflection light beams $A_1$ and $A_2$ is decreased.

Figure 43:
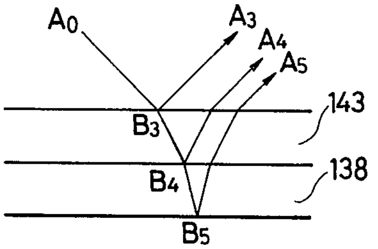
FIGS. 43 and 44 are explanatory diagrams each showing a transparent non-polar polymer layer formed on the surface on the magnetic panel.
Figure 44:
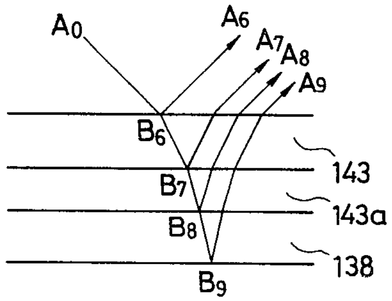

FIGS. 43 and 44 show structures for preventing the halation due to the reflection light beams. In the structure of FIG. 43, a transparent non-polar polymer layer 143 which is different in refractive index from the top substrate 138 is formed on the top substrate 138. The polymer layer 143 may be formed by coating the top substrate 138 with a transparent non-polar polymer, or may be transparent non-polar polymer film laid on the top substrate 138.

In the structure thus formed, an incident light beam $A_0$ is reflected by the polymer layer 143 at a point $B_3$ and by the top substrate 138 at points $B_4$ and $B_5$, thus providing reflected light beams $A_3$, $A_4$ and $A_5$. This light dispersion will lessen the degree of halation. The structure of FIG. 43 is effective when the refractive index (1.30 to 1.45 for instance) of the polymer layer 143 is smaller than that (1.46 to 1.70 for instance) of the top substate 138.

The top substrate 138 is made of a material selected from a group consisting, for instance, of polyvinyl chloride (refractive index of 1.53), polyester (refractive index of 1.65), cellulose acetate (refractive index of 1.50) and polycarbonate (refractive index of 1.55).

The polymer layer 143 is made of one selected from a group consisting, for instance, of ethylene tetraflouoride copolymer (refractive index of 1.40), ethylene trifluoride copolymer (refractive index of 1.35), polyvinylidene fluoride (refractive index of 1.42), etheylene olefin copolymer (refractive index of 1.48) and polypropylene (refractive index of 1.51).

The structure of FIG. 44 is different from that of FIG. 43 in that the polymer layer 143 is formed over a transparent adhesive layer 143*a* (of polyurethane, for instance) overlaying the top substrates 138. In the structure thus constructed, an incident light beam $A_0$) is reflected by the polymer layer 143 at a point $B_6$, by the adhesive layer 143*a* at a point $B_7$, and by the top substrate 138 at points $B_8$ and $B_9$, thus providing reflected light beams $A_6$ through $A_9$. This light dispersion will further lessen the degree of halation. This structure is more effective when the refractive index (1.30 to 1.45, for instance) of the polymer layer 143 is smaller than that (1.46 to 1.70) of the top substrate 138.

As is apparent from the above description, the display unit according to the invention is capable of displaying characters or patterns in which dots are closed to one another, and it is high in printing speed and is suitable for copying data displayed on the magnetic panel.

What is claimed is:

1. A display unit comprising:

a magnetic panel made up of two substrates one of which is transparent, said panel being filled with a dispersion liquid of one color in which magnetic particles of another color are dispersed;

a recording head having a plurality of electromagnets for applying magnetic fields to said magnetic panel to display patterns, each of said electromagnets satisfying the condition of $D>2d$, where D is a main diameter of said electromagnet and d is a diameter of an end portion of said electromagnet;

means for selectively activating said electromagnets while said recording head is moved over said magnetic panels to display said patterns as a plurality of dots;

a moving device for moving said recording head in a predetermined direction along said magnetic panel;

control means for controlling the drive of said moving device and the application of current to said electromagnets; and an erasing head arranged slidably on the rear surface of said magnetic panel;

wherein said electromagnets are arranged in such are manner that at least three electromagnets are positioned on each of a plurality of lines inclined with respect to said direction of movement of said recording head and said electromagnets are positioned respectively on a plurality of lines which extend in parallel with said direction of movement of said recording head and are arranged at equal intervals.

2. A display unit as claimed in claim 1, in which $P \leqq d$ is established, where P is the pitch of said plurality of lines in parallel with said direction of movement of said recording head.

3. A display unit as claimed in claim 1, in which each of said electromagnets comprises:

a bobbin;

a coil wound on said bobbin;

a magnetic thin plate provided at a front end of said bobbin;

and a core having a tapered end portion which is inserted into a hole formed in said magnetic thin plate;

wherein an annular gap is formed between said tapered end portion and the inwardly tapered cylindrical wall of said hole, and $\theta' \geqq \theta$, where $\theta'$ is a taper angle of said inwardly tapered cylindrical wall of said hole and $\theta$ is a taper angle of said tapered end portion of said core.

4. A display unit as claimed in claim 1, in which said recording head is a serial type recording head.

5. A display unit as claimed in claim 4, wherein said moving device comprises:

an electric motor for moving said recording head in said direction of movement; and an electric motor for moving said recording head and said erasing head in an auxiliary scanning direction perpendicular to said direction of movement, said heads being so arranged that said erasing head goes ahead of said recording head while said recording head is moving in said auxiliary scanning direction.

6. A display unit as claimed in claim 4, which further comprises an erasing head moving device for moving said erasing head.

7. A display unit as claimed in claim 4, in which said recording head comprises:

a board commonly supporting said electromagnets;

thrust bearings secured to said board in such a manner as to be in parallel with said electromagnets;

guides bars inserted into respective ones of said thrust bearings;

a carriage to which first ends of said guide bars are secured; and a springs interposed between said carriage and said board to push said electromagnets against said magnetic panel.

8. A display unit as claimed in claim 1, in which said recording head is a line type recording head extending horizontally of said magnetic panel.

9. A display unit as claimed in claim 8, in which said moving device comprises:

a motor for moving said recording head and said erasing head in said direction of movement, said recording and erasing heads being so arranged that said erasing head goes ahead of said recording head while said recording head is moving in a predetermined display data writing direction.

10. A display unit as claimed in claim 8, in which said recording head is a line type recording head extending horizontally of said magnetic panel.

11. A display unit as claimed in claim 9, further comprising a pushing roller device for pushing said magnetic panel against said recording head with the aid of spring means and disposed on a rear surface of said magnetic panel, said pushing roller device being moved in said direction of movement by said motor for moving said recording head.

12. A display unit as claimed in claim 1 further comprising an external device providing data for controlling the drive of said moving device and the application of current to said electromagnets.

13. A display unit as claimed in claim 12, in which said external device is a personal computer.

14. display unit as claimed in claim 12, in which said external device is an image scanner.

15. A display unit as claimed in claim 1, in which a reading head for reading data displayed on said magnetic panel is fixed to a side of said recording head.

16. A display unit as claimed in claim 15, further comprising a printer for printing out image data which are outputted by said reading head through photoelectric conversion.

17. A display unit as claimed in claim 15, in which said recording head is a line type recording head extendign horizontally of said magnetic panel, and said moving device includes an electric motor for moving said recording head, said reading head and said erasing head.

18. A display unit as claimed in claim 17, in which said recording, reading and erasing heads are so arranged that said erasing head goes ahead of said recording head while said recording head is moved from a predetermined display start position to a predetermined display end portion, and that said reading head goes ahead of said erasing head while said recording head is moved from said predetermined display end position to said predetermined display start position.

19. A display unit as claimed in claim 15 further comprising a transparent non-polar polymer sheet or layer disposed on said transparent substrate of said magnetic panel.

20. A display unit as claimed in claim 19, in which a refractive index of said tranparent non-polar polymer sheet or layer is smaller than a refractive index of said transparent substrate of said magnetic panel.

21. A display unit as claimed in claim 1 further comprising a transparent non-polar polymer sheet or layer disposed on said transparent substrate of said magnetic panel.

22. A display unit as claimed in claim 21, in which a refractive index of said transparent non-polar polymer sheet or layer is smaller than a refractive index of said transparent substrate of said magnetic panel.

* * * * *